J. C. RAYMOND.
TIRE.
APPLICATION FILED OCT. 5, 1908.
926,439.  Patented June 29, 1909.
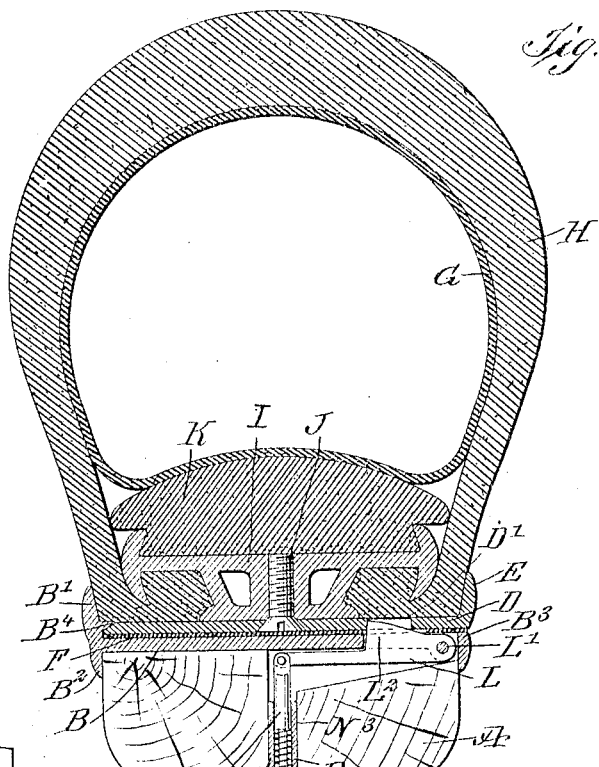
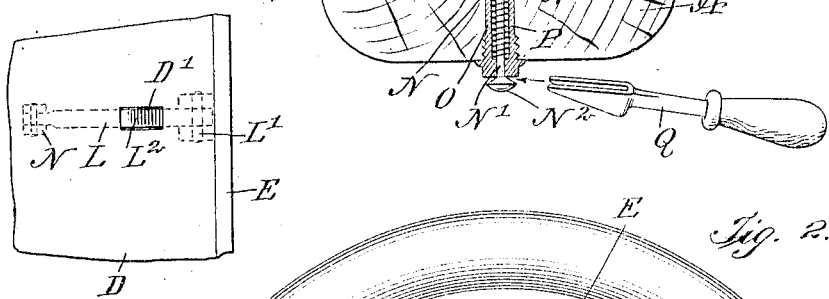
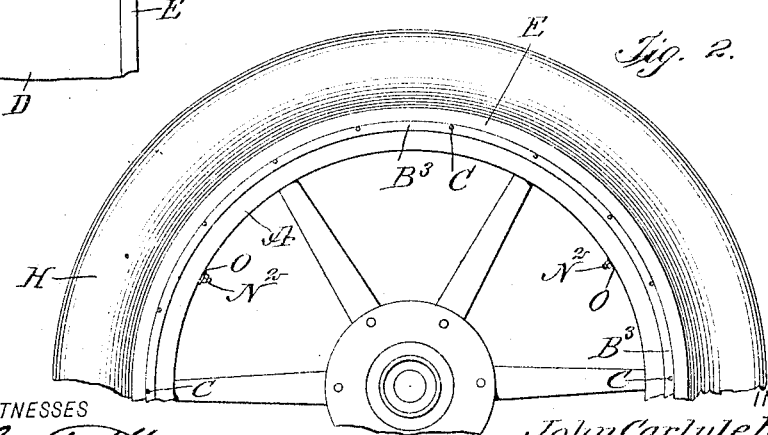
WITNESSES
INVENTOR
John Carlyle Raymond
BY Munn & Co
ATTORNEYS

UNITED STATES PATENT OFFICE.

JOHN CARLYLE RAYMOND, OF NEW YORK, N. Y.

TIRE.

No. 926,439.　　　Specification of Letters Patent.　　　Patented June 29, 1909.

Application filed October 5, 1908. Serial No. 456,283.

*To all whom it may concern:*

Be it known that I, JOHN CARLYLE RAYMOND, a citizen of the United States, and a resident of the city of New York, borough of Brooklyn, in the county of Kings and State of New York, have invented a new and Improved Tire, of which the following is a full, clear, and exact description.

The invention relates to tires, such as shown and described in the Letters Patent of the United States, No. 817,668, granted to me on April 10, 1906.

The object of the present invention is to provide a new and improved tire, arranged to permit of quickly disconnecting the tire from the rim of the wheel, for repairs or other purposes, and replacing the tire and securely locking it in place on the rim.

The invention consists of novel features and parts and combinations of the same, which will be more fully described hereinafter and then pointed out in the claims.

A practical embodiment of the invention is represented in the accompanying drawings forming a part of this specification, in which similar characters of reference indicate corresponding parts in all the views.

Figure 1 is a cross section of the improvement; Fig. 2 is a reduced side elevation of part of an automobile wheel provided with the improvement; and Fig. 3 is a plan view of part of the base plate and one of the locking devices for the same.

On the rim A of the wheel fits a rim plate B provided at one edge with an integral upturned flange B' and an integral down-turned flange B², the latter engaging the corresponding side of the rim A, as plainly indicated in Fig. 1. To the other edge of the rim plate B is secured a down-turned flange B³ by the use of screws C or other fastening devices, the top of the flange B³ being flush with the outer face of the rim plate B, so that this edge of the rim plate B is unobstructed, to allow of slipping the base plate D laterally over the rim plate B from the right, in Fig. 1. The base plate D is provided at its outer edge with an upturned flange E corresponding to the flange B', and the inner edge of the said base plate D is adapted to fit under a rib B⁴ formed on the inner face of the flange B'. A lining F of rubber or other suitable material is interposed between the rim plate B and the base plate D, to prevent any rattling when the parts are assembled, as shown in Fig. 1.

The tire as illustrated has the inner tube G and the casing H attached to the tire frame I in the manner more fully shown and described in the Letters Patent above referred to, so that further description of the same is not deemed necessary, it being understood that this tire frame I is secured by screws J to the base plate D, the screws J being introduced from the inner surface of the base plate, as indicated in Fig. 1. The tire is also provided with a cushion K of rubber or other suitable material, and forming a seat for the inner side of the inner tube G, so that when the tire is collapsed the cushion K tends to avoid any injury to the inner tube G and the casing A.

In order to hold the base plate D and the tire frame I and casing H containing the inner tube G in position on the rim plate B, a number of locking devices are provided, preferably four, spaced equidistant apart, and each consisting of a catch L fulcrumed at L' on the rim plate B, the shoulder L² of the catch being adapted to snap into an aperture D' formed in the base plate D, as shown in Figs. 1 and 3. When the shoulder L² engages the aperture D', it prevents lateral displacement of the base plate D to the right, it being understood that lateral displacement to the left is prevented by the inner edge of the base plate D abutting against the upturned flange B' under the rib B⁴.

The free end of the catch L is pivotally connected with a rod or handle N mounted to slide in a bearing O, screwed or otherwise attached to the rim A and extending to the under surface thereof, and the said rod N has a reduced portion N', terminating in a head N², normally abutting against the outer end of the bearing O, as plainly shown in Fig. 1. A spring P is coiled around the reduced portion N' within the bearing O and presses against a shoulder N³ between the rod N and the reduced portion N', to normally hold the shoulder L² of the catch L in engagement with the aperture D' of the base plate D.

When it is desired to unlock the base plate D, the heads N² are pulled outward, preferably by the use of a suitable forked tool Q, as indicated in Fig. 1, so that the catch L is swung inward and the shoulder L² moves out of engagement with the aperture D', to allow of sliding the base plate D and the parts attached thereto laterally to the right and over the rim A of the wheel. The tool Q is preferably held interposed between the head N² and the end of the bearing O, so as to keep the catches L in the withdrawn position, that is, until the desired repairs have been made to the tire, after which the tire is replaced on the rim plate B, and then the tools Q are removed, to allow the springs P to swing the catches L outward into locking position, that is, to reëngage the shoulders L² with the apertures D'.

From the foregoing it will be seen that when the shoulders L² of the catches L engage the apertures D' of the base plate D, then the base plate D and the parts supported thereon are held against lateral movement to the right and also against a creeping in a longitudinal direction on the rim plate B.

The device is very simple and durable in construction and the parts can be very conveniently assembled and disconnected for repairs and other purposes.

Having thus described my invention, I claim as new and desire to secure by Letters Patent:

1. In combination, a rim having a rim plate provided at one edge with a downturned flange and at the opposite edge with an upturned and a downturned flange, the upturned flange being provided with a rib, a base plate adapted to be slipped over the edge of the rim plate having but one flange onto the latter, the inner edge of the said base plate engaging the said rim plate flange below the rib thereof, the outer edge of the said base plate having an upturned flange, a tire frame removably secured to the said base plate and carrying a tire casing, and pivoted and spring pressed locking devices on the said rim and its rim plate and engaging the said base plate to lock the same against lateral and peripheral movement.

2. In combination, a rim having a rim plate provided at one edge with a flange, a slotted base plate adapted to be slipped over the non-flanged edge of the rim plate onto the latter, the inner edge of the said base plate engaging the said rim plate flange, the outer edge of the said base plate having a flange, a tire frame removably secured to the said base plate and carrying a tire casing, a catch pivoted on the said rim plate and adapted to engage the edge of a slot in the said base plate to hold the latter against lateral and peripheral movement, and a spring-pressed handle radially slidable in the said rim, and connected at its outer end with the said catch, the inner head end of the handle extending on the inside of the rim for manipulating said catch.

3. In combination, an apertured rim having a rim plate provided at one edge with a flange, a slotted base plate adapted to be slipped over the non-flanged edge of the rim plate onto the latter, the inner edge of the said base plate engaging the said rim plate flange, the outer edge of the said base plate having a flange, a tire frame removably secured to the said base plate and carrying a tire casing, a catch pivoted at one end to the said rim plate and adapted to engage the edge of a slot in the said base plate to hold the latter against lateral and peripheral movement, a handle pivotally connected at its outer end with the free end of said catch and radially slidable in the aperture of said rim, the inner end of the handle terminating in a head for manipulating the said catch, and a spring surrounding the said handle in the aperture of the rim and normally holding the catch in engagement with the said base plate.

In testimony whereof I have signed my name to this specification in the presence of two subscribing witnesses.

JOHN CARLYLE RAYMOND.

Witnesses:
  THEO. G. HOSTER,
  JOHN P. DAVIS.